Figure 1:
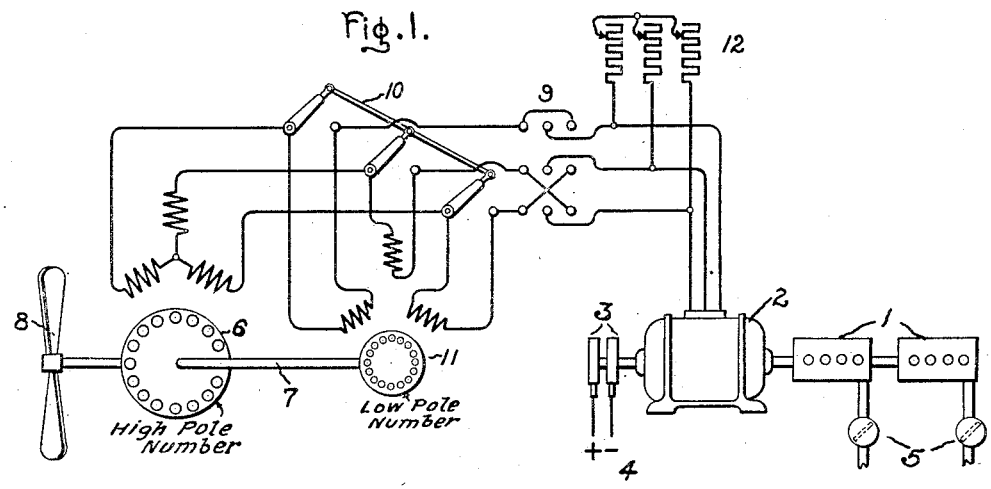

Feb. 5, 1929.

H. M. HOBART 1,701,368

ELECTRIC SHIP PROPULSION

Filed Nov. 14, 1921

Inventor:
Henry M. Hobart,
by Albert G. Davis
His Attorney.

Patented Feb. 5, 1929.

1,701,368

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC SHIP PROPULSION.

Application filed November 14, 1921. Serial No. 514,846.

My invention relates to electric ship propulsion and particularly to systems of ship propulsion where the propellers are driven by polyphase induction motors of the squirrel cage type. The invention has for its object an improved combination and arrangement of electrical apparatus for ship propulsion systems in which the first cost is low and in which there is provided a simple and efficient control of the speed and direction of rotation of the propeller.

In my United States Patent No. 1,304,181, May 20, 1919, I have described in connection with an electric ship propulsion system advantages to be gained by using low frequency alternating current (not greater than 10 cycles per second) for supplying an alternating current propeller motor. As pointed out in said patent the motor for such low frequencies may be very efficiently designed and an efficient propeller action may be had without the use of reduction gearing between the motor and propeller. In that patent a system is described in which the propeller motor is a wound rotor induction motor the speed of which is varied by means of an adjustable source of polyphase counterelectromotive force electrically connected to its secondary windings. According to my present invention the advantages of a low frequency source of supply are retained and the control equipment greatly simplified without sacrificing reliability.

In carrying out my present invention I use a direct connected, polyphase induction motor of the low resistance squirrel cage type for driving a ship propeller and supply said motor from a low frequency generator adapted to have its speed varied from full speed down to something less than half speed for obtaining corresponding propeller speeds. For lower propeller speeds and for reversing I make use of a small, auxiliary polyphase induction motor connected in series with the main motor. This auxiliary motor is also directly connected to the propeller but is designed with a high resistance squirrel cage and a fewer number of poles so that when operating in series with the main motor it will have high slip and do most of the work of driving the propeller. If a lower ship speed is desired than that obtainable when the generator is running at its lowest speed and the auxiliary motor connected in series with the main motor, it may be obtained by intermittently disconnecting the motors from the generator. That is, the motors may be switched on for a few seconds or minutes and off again, as often as may be required to maintain the desired abnormally low speed. To lessen the time required for reversal from full speed, I may combine with this arrangement means for securing a dynamic braking action as for example a rheostat load adapted to be connected across the generator terminals for quickly reducing the speed when the driving power is shut off.

Figure 2:
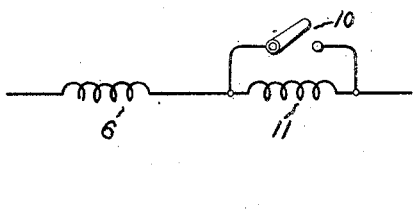
Figure 3:
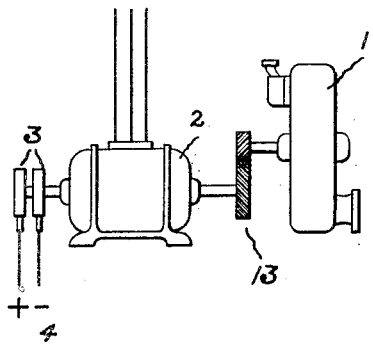

The novel features of my invention which I believe to be patentable are definitely pointed out in the claims appended hereto. The invention itself, together with the arrangement of apparatus and the method of operating the same, will be best understood from the following description taken in connection with the accompanying drawings, in which Fig. 1 diagrammatically represents a ship propulsion system embodying my invention, where the generator is driven by a direct connected slow speed prime mover; Fig. 2 is a simplified diagram of the control circuits for the motors of Fig. 1, and Fig. 3 shows a modification wherein the generator is driven through reduction gearing from a high speed steam turbine.

Referring to Fig. 1, I have illustrated a slow speed prime mover comprising one or more oil engines 1 direct connected to a low frequency polyphase, alternating current generator 2. The generator is of the revolving field type and is accordingly provided with slip rings 3 which serve to conduct the exciting current to the revolving field from a suitable source of direct current indicated by the mains 4. The prime mover is adapted to have its speed varied from full speed down to something below half speed by the throttling device illustrated at 5. A low resistance, squirrel cage, propeller motor 6 is direct connected to a propeller shaft 7 and serves to drive the propeller 8 at the higher speeds when connected to the generator 2 through the reversing switch 9 and short circuiting switch 10. Also direct connected to the propeller shaft 7 is the rotor of a small, squirrel cage, polyphase, induction motor 11. The stator windings of this motor are adapted to be connected in series with those of generator 2 and main motor 6 when switch 10 is open. The closing of switch 10 short circuits the primary windings of motor 11 and connects motor 6 directly to the generator 2. This circuit control arrangement is more simply shown in the single line diagram of Fig. 2. Although I have here shown the windings of motor 11 as being short circuited by means of the switch 10 when it is desired to operate with only the motor 6, it will be understood that other methods of deenergizing motor 11 may be used. For instance, I might partially or wholly disconnect the same from the circuit. These two motors are connected to have the same direction of rotation and it is obvious that both will be reversed by changing the phase rotation of the polyphase current supplied thereto by means of the usual reversing switch represented at 9. The motor 11 is of much smaller capacity than motor 6 and it is designed with a fewer number of poles and a higher resistance secondary. Consequently when its stator windings are connected in series with those of motor 6 it will have a high slip and will do practically all of the work of driving the propeller. The exact relation between the designs of the two motors will vary with different installations and will depend to some extent upon the nature of the prime mover used to drive the generator.

In order that this relation may be fully understood I will mention a concrete case and illustrate the practical application of my invention thereto. I will take by way of example a single propeller cargo-boat with a cargo capacity of about 2500 tons and a maximum speed of 9 knots. Such a boat will require a propeller motor capable of delivering 600 H. P. at 120 R. P. M. and a prime mover of about 700 H. P. For the application of my invention the prime mover must be capable of having its speed varied to something below half speed. For these conditions I may use two, 8 twin-cylinder, Diesel oil engines each capable of delivering 350 H. P. at 480 R. P. M. As illustrated in Fig. 1 I connect these engines directly to a bi-polar, 8 cycle, polyphase generator 2. I make the main propeller motor 6 a 600 H. P. 8 pole squirrel cage induction motor and the small motor 11 a 4-pole, high resistance squirrel cage motor capable of delivering about 50 H. P. at 50% slip with a frequency and voltage corresponding to the lowest speed of the generator. The speed of the Diesel oil engines together with the generator 2 may be very effectively regulated down to at least 200 R. P. M. by varying the amount of fuel oil supplied at each stroke. For this purpose I may connect the two valves indicated at 5 to a single lever so as to be regulated together. However, the exact method of varying the speed of the engine is immaterial and the valves 5 may constitute any well known throttling devices.

The operation of the apparatus just described will now be explained.

With the generator 2 driven at 480 R. P. M. and switches 9 and 10 closed an 8 cycle polyphase current will be delivered directly to the main motor 6. Neglecting slip, motor 6 will then drive the propeller at 120 R. P. M. corresponding to the full speed of the ship of 9 knots. By regulating the speed of the engines down to 200 R. P. M. I obtain a proportional speed of 50 R. P. M. for the propeller which corresponds to a speed of about 3.75 knots for the ship. Thus with the generator supplying the main motor 6 only, any ship speed between 3.75 and 9 knots per hour may be obtained by regulating the speed of the engines to the corresponding point between 200 and 480 R. P. M. For a ship speed of 3.75 knots, corresponding to 50 R. P. M. for the propeller, only about $\frac{1}{12}$ of the power required for full speed is necessary. The torque required to reverse the propeller is now well within the torque capacity of the auxiliary high resistance squirrel cage motor. The relation between propeller torque and propeller speed in a ship propulsion system is such that the torque required to break the propeller from the water is nearly equal to the torque required to drive the propeller at the speed necessary to give the speed of the ship obtaining at the time reversal is attempted. This maximum torque for the given condition occurs at a propeller speed of about 35%.

After this point has been passed the propeller can easily be stopped and can be held at standstill by a torque of approximately 40%. If a quick stop of the ship is to be effected it is not only necessary to stop the propeller but it must be revolved in the opposite direction. The torque required to revolve the propeller at 33% speed backwards is approximately equal to the torque required to drive the ship ahead at the speed in question. To render the torque of the auxiliary high resistance squirrel cage motor available it may be connected in series with the main motor 6 by opening the short circuiting switch 10. Since the motor 11 is designed with but half the number of poles of the motor 6 and has a high resistance squirrel cage it will run at approximately 50% slip while the motor 6 is running with negligible slip.

The apparatus is now in condition to slow down, stop or reverse the propeller. If it is desired to slow down the ship below 3.75 knots the engine speed is not further reduced, but instead, the circuit between the motors and the generator is alternately opened and closed, for example, by means of the reversing switch 9 as heretofore set forth.

If it is desired to reverse the propeller momentarily to bring the ship to a stop the switch 9 is reversed and left closed until the motor 11 has reversed the direction of rotation of the propeller and brought it up to a speed in opposite direction sufficient to check the progress of the boat.

The manner of starting the boat from rest will now be explained. The engines are first started and brought up to a speed of 200 R. P. M. Assuming that switch 10 is open and switch 9 closed in the direction corresponding to the direction in which it is desired to move the ship, excitation is applied to the generator and motor 11 starts from rest and quickly brings the propeller speed up to 50 R. P. M. Switch 10 is now closed and main motor 6 receives the full voltage of the generator and consequently takes up the propeller load. The engine speed is now increased until the desired propeller speed is reached.

In the foregoing discussion it was assumed that the rheostat load represented at 12 was open circuited or disconnected from the line. This rheostat is not essential to my invention as evidenced from the preceding discussion but it sometimes becomes desirable quickly to reverse the ship's propeller when running at full speed. It is evident that unless some means are provided other than the friction of the rotating apparatus for quickly decreasing the speed of the engines it would require some little time for them to slow down to 200 R. P. M. when the ship is moving through the water at a high rate of speed. I therefore propose to use a water rheostat 12 of cheap construction as a load for the generator for quickly reducing its speed from 480 to 200 R. P. M. when the engine fuel supply is cut off. The operation of the apparatus when used with the rheostat is as follows:

Assuming that the ship is being propelled at full speed ahead, switches 9 and 10 will be closed and the rheostat 12 open circuited. To reverse the direction of rotation of the propeller the fuel supply to the engines is first cut off, then the rheostat load is applied by short circuiting the generator therethrough. As soon as the engine speed is reduced to 200 R. P. M. the throttle 5 is opened a sufficient amount to keep the engine at this speed, the rheostat load is removed, switch 10 opened and the reversing switch 9 operated to reverse the phase rotation supplied to the motors. When the reversal has been effected switch 10 may be closed and the propeller speed increased the desired amount by increasing the engine speed. The quick reversal of the ship is facilitated by the use of the rheostat 12 for the reason that the propeller driving motor will operate as an induction generator to brake the ship dynamically since the rotor of the induction motor will be driven by the propeller acting as a turbine. This dynamic braking effect will be of greater magnitude where the prime mover is a high speed turbine, the rotating parts of which have considerable inertia.

From the preceding description it is seen that the small motor 11 simply takes the place of the apparatus which would be necessary if the rotor of the main motor 6 were fitted with slip rings and brushes and if the control of motor 6 were effected by an external resistance. Since motor 11 is only in circuit for short times and since its capacity is only $\frac{1}{12}$ of the capacity of motor 6 it is evident that its cost will be only a small percentage of the cost of motor 6. In the example given motor 11 will not add more than 15% to the cost of the motor equipment. To those familiar with motor equipment costs it will be evident that this is less than the additional cost of fitting the main motor 6 with a wound rotor, slip rings, brushes and an external resistance regulator.

While the invention has been shown in connection with three phase equipment it is not limited thereto. Any polyphase equipment in which it is possible to reverse the motors by reversing the phase rotation of the current supplied thereto will accomplish the same results.

It is not essential that the generator be direct connected to a slow speed engine or that the engine be of any special type. I may use for example any kind of prime mover capable of having its speed varied down to something below half speed. In Fig. 3 I have shown a high speed steam turbine 1 connected through reduction gearing 13 to a low frequency, polyphase generator 2.

For full speed the turbine will operate at high economy and develop its full power. The proportion of time in which it will be necessary to operate the turbine at slower speeds will be comparatively small and since the power required rapidly falls off as the propeller speed is reduced it is entirely feasible from the standpoint of economy to use a high speed steam turbine, such as illustrated, for the purpose of driving the low frequency generator used in my invention.

While I have described the above system for a single propeller, it is clear that it is entirely applicable to vessels fitted with more than one propeller. It is also evident that I might change the synchronous speed relations existing between the propeller motors making corresponding changes in their capacity relation without departing from the scope of my invention.

Various other modifications might be made and I accordingly do not desire to be limited to the exact arrangement described but seek to cover in the following claims all such modifications and arrangements as properly fall within the scope and spirit of my invention.

What I claim as new and desire to protect by Letters Patent of the United States, is,—

1. An electric ship propulsion system comprising a propeller shaft; a direct-connected, polyphase, induction motor of the squirrel cage type for driving said shaft at high speeds; a second direct connected, polyphase, induction motor of the squirrel cage type for driving said shaft at low speeds, said second motor being of relatively smaller capacity and higher secondary resistance and having a pole number less than that of the first mentioned motor; a source of polyphase alternating current having a frequency no greater than ten cycles per second adapted to be connected to supply said motors in series for low speed operation; means adapted to deenergize said high resistance motor, and means for varying the frequency of said alternating current source for varying the speed at which said propeller is driven when said high resistance motor is deenergized.

2. In an electric ship propulsion system, a low frequency, polyphase alternator; a prime mover connected to drive said alternator; a polyphase, squirrel cage, induction motor direct connected to a propeller shaft and designed to drive said shaft with low slip at its highest speed; a transmission line containing a reversing switch connecting said alternator to said motor; means for varying the speed of said prime mover between full speed and something below half speed for correspondingly varying the speed of said motor; a second polyphase, induction motor, having a pole number less than that of the first mentioned motor, also direct connected to said propeller shaft, and designed to drive the same, when connected in series with the first mentioned motor and when the alternator is being driven at its lowest speed, at a minimum slip substantially equal to the difference between the synchronous speeds of said motors under these conditions, and switching means associated with said transmission line adapted in one position to connect said motors in series and in another position to energize only said first mentioned motor.

3. A ship propulsion system comprising in combination, a propeller shaft; a polyphase, squirrel cage, induction motor direct connected to said shaft and designed to drive the same with low slip at its highest speed; a low frequency, polyphase alternator for supplying said motor; a prime mover connected to drive said alternator; means for varying the speed of said prime mover between full speed and substantially 40% full speed for correspondingly varying the speed of said propeller motor; a transmission line, containing a reversing switch connecting said alternator to said motor; a variable resistor associated with said transmission line adapted to short circuit said generator for quickly reducing its speed to the lowest value mentioned; a second polyphase, squirrel cage induction motor having half as many poles as said first mentioned motor and of relatively low capacity also directly connected to said propeller shaft, said low capacity motor being designed to drive said shaft at substantially 50% slip when connected in series with said first mentioned motor and when said alternator is being driven at substantially 40% of full speed, and switching means associated with said transmission line adapted in one position to connect said motors in series and in another position to energize only said first mentioned motor.

4. A system for electrically driving a ship propeller comprising an 8-pole, polyphase, squirrel cage, induction motor direct connected to the propeller shaft and adapted to drive said shaft with low slip at speeds between 50 and 120 R. P. M.; a source of supply for said motor comprising a 2-pole, polyphase alternator; means for varying the speed of said alternator between substantially 200 and 480 R. P. M. for varying the speed at which said propeller is driven by said 8-pole motor; a transmission line, including a reversing switch, between said motor and alternator; a 4-pole, polyphase, squirrel cage, induction motor of substantially $\frac{1}{12}$ the capacity of the 8-pole motor direct connected to said shaft and designed to drive said shaft with a minimum slip of substantially 50% at speeds below 50 R. P. M., and switching means associated with said transmission line adapted in one position to connect said 4-pole motor in series with said 8-pole motor and in another position to energize only said 8-pole motor.

In witness whereof I have hereunto set my hand this 10th day of November, 1921.

HENRY M. HOBART.